United States Patent [19]

Korevaar et al.

[11] Patent Number: 4,881,068

[45] Date of Patent: Nov. 14, 1989

[54] THREE DIMENSIONAL DISPLAY APPARATUS

[76] Inventors: Eric J. Korevaar, 7506 Charmant Dr. #825, San Diego, Calif. 92122; Brett Spivey, 131 Seeman, Encinitas, Calif. 92024

[21] Appl. No.: 165,543

[22] Filed: Mar. 8, 1988

[51] Int. Cl.[4] .................................................. G09G 3/06
[52] U.S. Cl. ...................................... 340/766; 340/700; 364/521
[58] Field of Search .................. 340/700, 795, 766; 365/107, 119, 127; 364/521

[56] References Cited

U.S. PATENT DOCUMENTS

| | | | |
|---|---|---|---|
| 3,789,397 | 1/1974 | Evans | 343/6 |
| 3,940,748 | 2/1976 | Carson | 365/119 |
| 4,023,158 | 5/1977 | Corcoran | 250/251 |
| 4,041,476 | 8/1977 | Swainson | 340/700 |
| 4,288,861 | 9/1981 | Swainson et al. | 365/127 |
| 4,333,165 | 6/1982 | Swainson et al. | 365/119 |

Primary Examiner—Gerald Brigance

[57] ABSTRACT

A 3-D visual display apparatus. A sealed chamber having one or more walls transparent to visible light contains a gas having a first excited state and a second excited state which second excited state relaxes with the emission of visible light. A first laser source excites a small first volume of the gas to the first excited state and a second laser source excites a second volume, which is a small portion of the small first volume, to the second excited state which relaxes to emit visible light in all directions from the small second volume. This small light emitting volume appears as a small spot of light. Rapid movement of the two lasers permits the creation of other light emitting spots quickly enough to produce what appears to the human eye as a 3-D display. By proper choice of gases and lasers, visible light in all colors can be emitted from the spots to produce a 3-D color display. By changing the distribution of illuminated spots as time progresses, the objects simulated in the display can be caused to move.

16 Claims, 4 Drawing Sheets

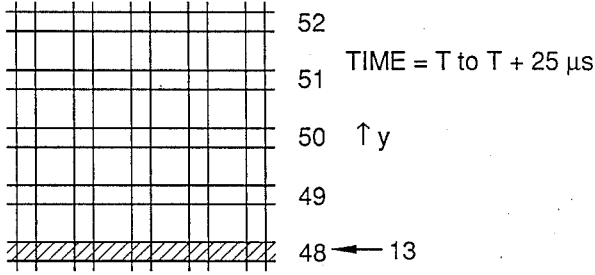
FIG. 3A
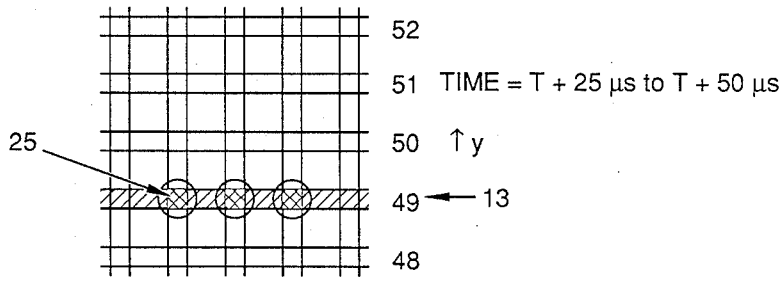
FIG. 3B
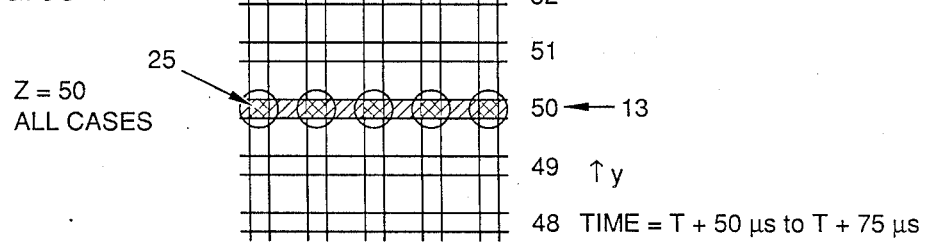
FIG. 3C
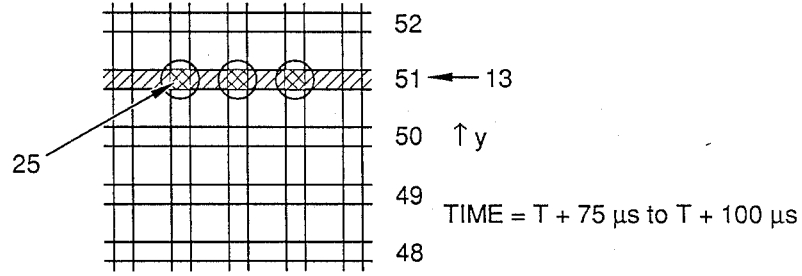
FIG. 3D
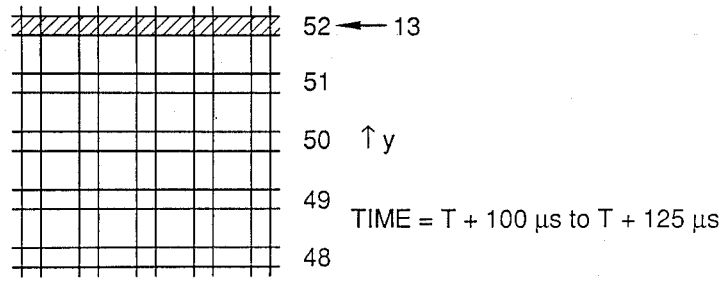
FIG. 3E
FIG. 3

THREE DIMENSIONAL DISPLAY APPARATUS

This invention relates to systems for displaying or simulating the positions of objects and in particular to systems for creating a three-dimensional (3-D) display of such objects.

BACKGROUND OF THE INVENTION

There are many types of so-called 3-D display devices on the market which are not truly 3-D but in fact produce a 2-D image on a screen which is made to appear as a 3-D image. Attempts have been made to create real 3-D moving displays. One such device described in U.S. Pat. No. 4,023,158 (Corcoran) uses a laser beam to levitate glass spheres to produce a 3-D display. Another device described in U.S. Pat. No. 3,789,397 (Evans) proposes to create a 3-D display by intersecting two or more laser beams to create a spot of illumination. Evans claims that his two lasers will intersect to produce a "hot spot" or "visible spot". Evans does not describe the nature of this "hot spot" or "visible spot" or any of the details of the laser beams which he would use to produce it. Typically, intersecting laser beams will not produce a visible spot. Evans indicates that the laser beams intersect in an atmosphere which may be air or some other selected atmosphere but he does not otherwise disclose what the atmosphere should be.

SUMMARY OF THE INVENTION

Our invention provides the foundation of a new industry: 3-D color television. Our invention is a 3-D visual display apparatus viewable from multiple directions. A sealed chamber having one or more walls transparent to visible light contains a gas having a first excited state and a second excited state which second excited state relaxes with the emission of visible light. A first laser source excites a small first volume of the gas to the first excited state and a second laser source excites a second volume, which is a small portion of the small first volume, to a second excited state which relaxes to emit visible light in all directions from the small second volume. This small light emitting volume appears as a small spot of light. Rapid movement of the two lasers permits the creation of other light emitting spots quickly enough to produce what appears to the human eye as a 3-D display. By proper choice of gases and lasers, visible light in all colors can be emitted from the spots to produce a 3-D color display. By changing the distribution of illuminated spots as time progresses, the objects simulated in the display can be caused to move.

BRIEF DESCRIPTION OF THE DRAWINGS

FIGS. 3A, B, C, D and E are sketches demonstrating the operation of an aspect of one preferred embodiment of our invention.

DETAILED DESCRIPTION OF PREFERRED EMBODIMENTS

Figure 1:
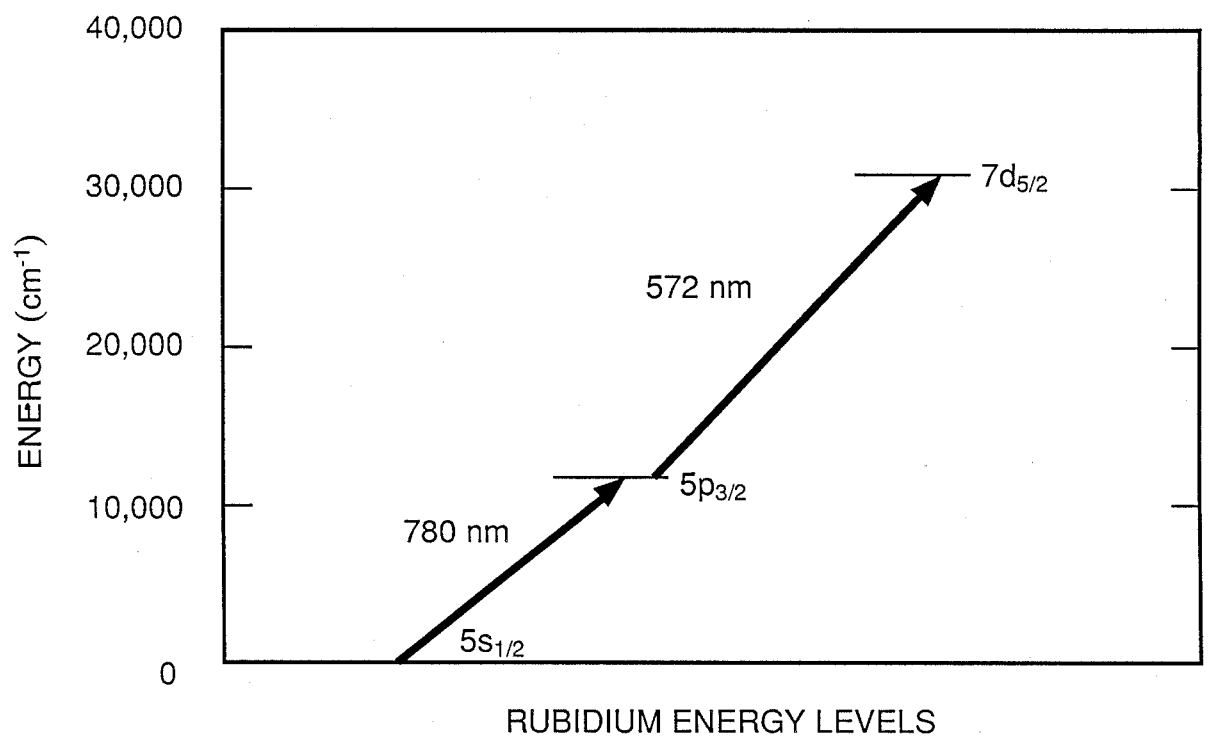
FIG. 1 is a simplified partial energy level diagram of rubidium.

FIG. 1 is an energy level diagram showing three of the energy levels of the element rubidium (Rb): the $5s_{\frac{1}{2}}$ level, the $5p_{3/2}$ level, and the $7d_{5/2}$ level. Persons skilled in the art will recognize that an electron of Rb in the $5s_{\frac{1}{2}}$ state can be easily excited into the $5p_{3/2}$ state with infrared laser radiation having a wavelength of about 780 nm. Rb will remain in that state for on the average about 26 ns. While in the $5p_{3/2}$ state, Rb can be further excited into the $7d_{5/2}$ excited state with yellow laser radiation having a wavelength of about 572 nm. Rb will remain in the $7d_{5/2}$ excited state for an average of about 320 ns before relaxing 73% of the time back to the $5p_{3/2}$ state with the emission of visible yellow light of wavelength 572.411 nm.

Figure 2:
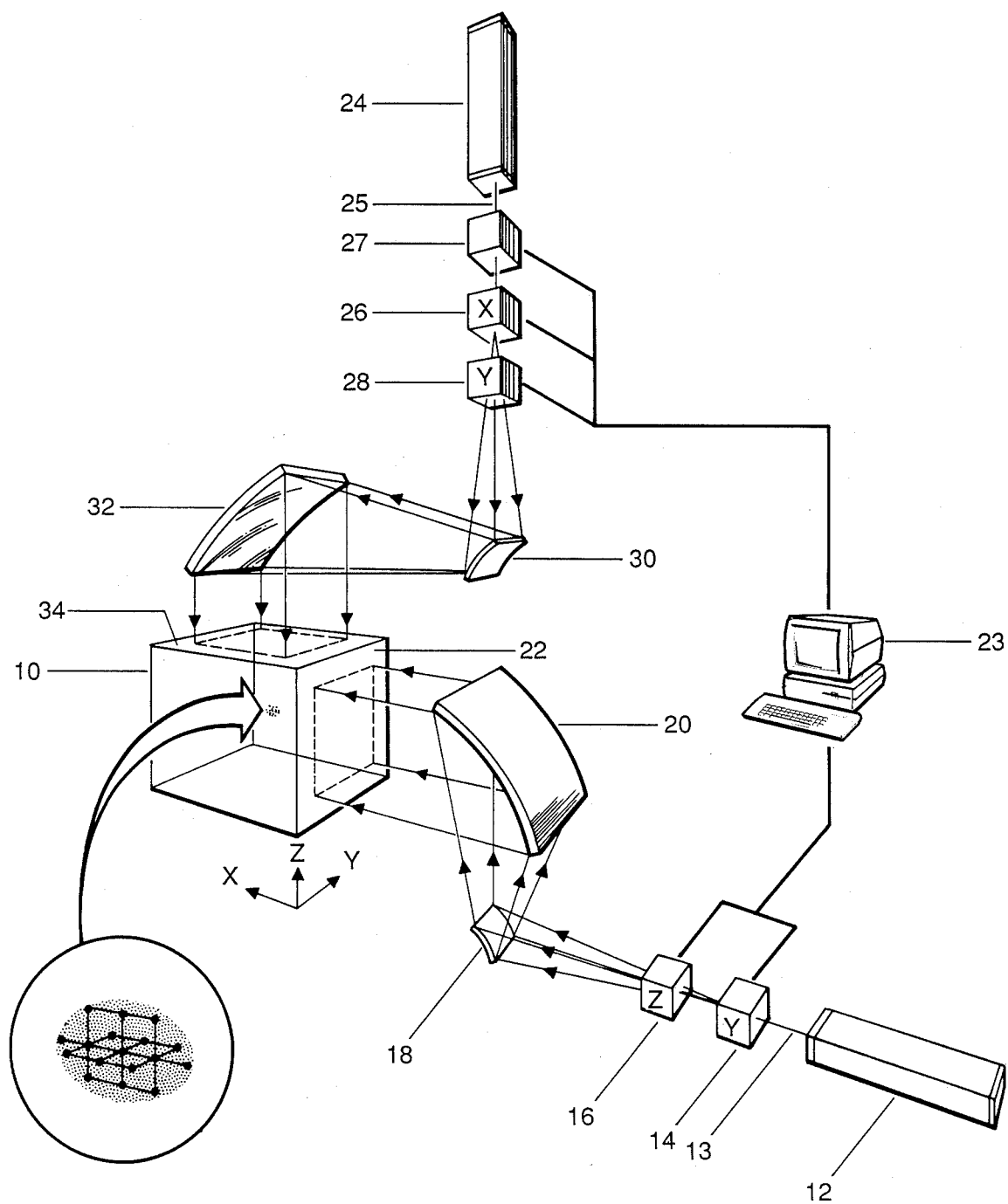
FIG. 2 is a pictorial view of a preferred embodiment of our invention.

A simple embodiment of our invention can be described by reference to FIG. 2. A sealed cubic container 10, 30 cm×30 cm×30 cm, having walls and top transparent to visible light contains Rb vapor at a density of $3 \times 10^{13}/cm^3$ produced by heating Rb to approximately 130° C.

Infrared laser 12 produces a laser beam 13 of about 780 nm wavelength, 1 mm in diameter and with 1.2 W power. The beam 13 is controlled in the Y direction by acousto-optic scanner 14 and in the Z direction by acousto-optic scanner 16. The laser beam from infrared laser 12 is reflected from small convex mirror 18 and larger concave mirror 20 which are fabricated and positioned so that laser beams from laser 12 may enter container 10 in a direction perpendicular to side 22 of container 10 at any point on the 20 cm×20 cm section centered on side 22. Acousto-optic scanners 14 and 16 are controlled by a computer 23 to cause beam 13 to scan the 20 cm×20 cm section of side 22. The beam is concentrated on 10,000 spots (100×100) on the 20 cm×20 cm section of side 22, each spot for about 25 μs.

Assuming 50% of the photons in the 1.2 W laser beam get through the scanners and side 22 the laser beam entering the gas will be 0.6 W equivalent to about $2.3 \times 10^{18}$ photon/s. Since the beam area is $8 \times 10^{-3}$ cm$^2$ and the column length requiring excitation is 25 cm, the beam must excite the atoms in a volume of about $2 \times 10^{-1}$ cm$^3$. Since the density of Rb is $3 \times 10^{13}/cm^3$, the total number of atoms in the path volume is $6 \times 10^{12}$. The cross-section, Σ, for the $5s_{\frac{1}{2}}$ to $5p_{3/2}$ transition is $3 \times 10^{-11}$ cm$^2$. At the density $N = 3 \times 10^{13}/cm^3$, $\Sigma N = 900$ cm$^{-1}$ which means the photon mean free path is much less than 1 mm. Photons will be radiation trapped for a time of about 3 μs. Thus, the $5s_{\frac{1}{2}}$ to $5p_{3/2}$ transition will be saturated (with $\frac{2}{3}$ of the atoms in the path volume excited) because in 3 μs the number of photons entering the cell in laser beam 13 $(6.9 \times 10^{12})$ is greater than the total number of atoms in the path volume.

Similarly, laser 24 produces yellow laser beam 25 of about 572 nm wavelength, 1 mm diameter cross-section and 0.8 W power. The beam 25 passes first through acousto-optic shutter 27 and is controlled in the X direction by acousto-optic scanner 26 and in the Y direction by acousto-optic scanner 28. The beam is reflected from small convex mirror 30 and larger concave mirror 32 to enter container 10 in a direction perpendicular to top 34 at any point on the 20 cm×20 cm section centered on top 34. Acousto-optic scanners 26 and 28 are also controlled by computer 23 to cause beam 25 to scan the 20 cm×20 cm section of top 34. To illuminate each spot beam 25 must scan top 34 100 times for each scan of side 22 by laser 13. Beam 25 is directed by computer 24 to dwell for about 0.25 μs on each spot to be illuminated. Assuming 50% of the photons in the 0.8 W laser beam get through the scanners and side 34, the laser beam entering the gas will be 0.4 W.

Laser beam 25 further excites to the $7d_{5/2}$ level selected volumes of the Rb atoms excited by laser 13 to the $5p_{3/2}$ level. The 1 mm³ overlap volume contains $3\times10^{10}$ atoms. About ⅔ of these are in the $5p_{3/2}$ state. Up to 3/5 of these can be further excited to the $7d_{5/2}$ state. So:

$$(\tfrac{2}{3})\times(3/5)\times 3\times 10^{10} \text{ atoms} \approx 1.2\times 10^{10}\, 7d_{5/2} \text{ excited atoms.}$$

The transition rate, W, is given by $\Sigma N_{ph}$. Since $\Sigma = 5\times 10^{-13}$ cm² for this transition and since $$N_{ph} = (2.9 \times 10^{18} \text{ photons/J}) \times (0.4 \text{ J/s}) \left(\frac{1}{8 \times 10^{-3} \text{ cm}^2}\right) = 1.4 \times 10^{20}/\text{cm}^2\, s,$$

$$W = \sigma N_{ph} = 7 \times 10^7 \text{ sec}^{-1}.$$

This corresponds to a 14 ns 1/e time for the transition. Thus, it is completely saturated in a time much less than the 0.25 μs dwell time.

Fluorescence comes out of this volume radiated in $4\pi$ steradians with a time constant of 320 ns. About 73% is light at 572 mm. Thus, for every scan, we get $8.7\times 10^9$ photons from each spot in the $100\times 100\times 100$ array designated for illumination (such designation being controlled with acousto-optic shutter 27). At 0.25 μs per point, the complete $100\times 100\times 100$ point scan will take 0.25 s. We will thus get 4 scans/sec. (At this rate, some scanning effect will be visible to the eye. A scanning rate of 15 times/sec would look continuous to the eye, and should be achievable with the imminent development of faster scanners, or with a display reduction to $64\times 64\times 64$ spots.) At 4 scans/sec, each designated spot will produce $3.5\times 10^{10}$ photons/sec (i.e., $4\times 8.7\times 10^9$). The eye response is at 94% of a maximum of 673 lumen/W at a wavelenght of 572 mm. Thus, the brightness of each designated spot is:

$$(3.5 \times 10^{10} \text{ photons/s}) \times \left(\frac{1J}{2.9 \times 10^{18} \text{ photons}}\right) \times$$

$$(0.94) \times (673 \text{ lumens}/W) = 7.6 \times 10^{-6} \text{ lumen/spot}$$

If the average viewing distance is 30 cm this will produce an illuminance at that distance of:

$$\frac{7.6 \times 10^{-6} \text{ lumen}}{(4\pi) \times (0.3 \text{ m})^2} = 6.7 \times 10^{-6} \text{ lumen/m}^2.$$

Reducing this some to account for further losses, we end up with $5\times 10^{-6}$ lumen/m² for each of the $10^6$ spots chosen for illumination.

This brightness can be compared to the brightest star in the sky, Sirius, which has a brightness of $9.8\times 10^{-6}$ lumen/m². The threshold visibility for an achromatic $5\times 10^{-6}$ lumen/m² point source occurs at a background luminance of $10^2$ candela/m². (A chromatic source like ours should be visible in an even brighter background.) A luminance of $10^2$ candela/m² corresponds to a heavily overcast day. Our source of $5\times 10^{-6}$ lumen/m² is 100 times stronger than the threshold visible illuminance in a $10^{-1}$ candela/m background, corresponding to the background light under a full moon. Thus, our 3-D display can be easily viewed in a slightly darkened room.

As an example of a preferred method of creating 3-D displays, we may designate the $10^6$ spots using conventional XYZ coordinates. To display a football in the center of the matrix we might do it by illuminating the following 17 spots: (48, 50,50), (49, 50, 50), (50, 50, 50), (51, 50, 50), (52, 50, 50), (49, 50, 49), (50, 50, 49), (51, 50, 49), (49, 50, 51), (50, 50, 51), (51, 50, 51), (49, 49, 50), (50, 49, 50), (51, 49, 50), (49, 51, 50), (50, 51, 50), and (51, 51, 50) as demonstrated in FIG. 2.

For persons skilled in the art of working with acousto-optics, it is an easy matter to program computer 23 to provide for an illumination of these spots by laser beam 25 within a few nanoseconds after the spot has been illuminated by laser beam 13.

Laser beam 13 moves in the Y positive direction dwelling for about 5 μs intervals to illuminate a string of X's. As laser beam 25 is moving generally in the positive X direction as it scans, shutter 27 closes to avoid illuminating spots which should not be illuminated. FIG. 3 illustrates this process for the football display for the case where Z=50. As indicated in FIG. 3A, shutter 27 closes when laser beam 13 is directed at YZ spot (48, 50) so that none of the spots along Y, Z=(48, 50) are illuminated. In FIG. 3B, shutter 27 closes to avoid illuminating spot XY=(48, 49) but opens to illuminate spots XY=(49, 49), (50, 49) and (51, 49) and then closes to as to not illuminate spot (52, 49). On the next pass (FIG. 3C) when laser 13 is at YZ=(50, 50), laser 25 illuminates spots XY=(48, 50), (49, 50), (50, 50), (51, 50), and (52, 50). Similar steps, FIG. 3D and FIG. 3E, produce the additional spots needed to display the Z=50 portion of the football. The rest of the football is similarly produced.

In a similar manner the football can be made to move. A player can be created to throw the ball and one to catch it, and persons skilled in computer graphics will readily recognize that it is a straight forward matter to program the computer to simulate two football teams and an entire football game. Of course, if the entire 100 yard field is depicted on the screen with this embodiment, each player would be entitled to only 1 or 2 spots. Focusing on a 20 square yard area, however, would give each player about 30 spots. (Some linemen may get a few more.)

Acousto-optic light deflectors suitable for use in directing the laser beam are available from suppliers such as Newport Electro-Optics. Dye lasers suitable for producing laser beams 13 and 25 are also readily available in the market from suppliers including Coherent and Spectra-Physics. IBM Personal Computers could be easily programmed to control the beams by persons skilled in the computer graphics art.

Figure 4:
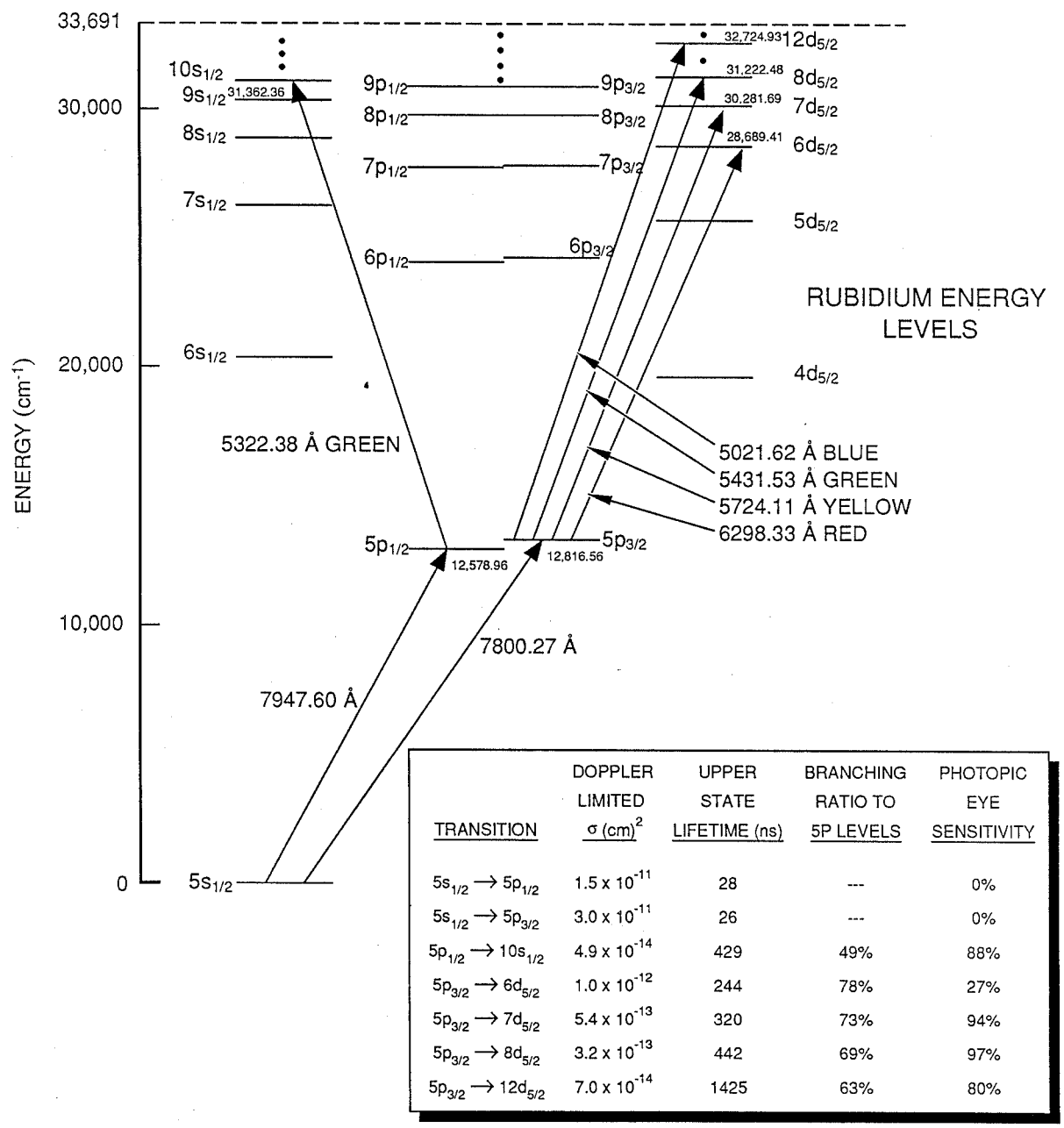
FIG. 4 is a more elaborate energy level diagram for rubidium.

In the embodiment described in detail above, the images will appear yellow. Other color displays could be provided by exciting the Rb atoms to other excitation states. For example, as is obvious from a close examination of FIG. 4 which is a more thorough energy level diagram for Rb, a blue light display could be provided by replacing laser beam 25 with a beam at 501 mm and red light display could be produced with a beam at 630 nm. By a combination of three lasers at these different wavelengths, various other colors could be produced. Three or more lasers could be simultaneously trained on a single spot using dichroic mirrors or diffraction gratings without compromising the matrix structure described in FIG. 2. Other methods may require arrangements other than the parallel and right angle structure of FIG. 2.

Also, persons skilled in the art will recognize that many elements other than Rb could be used as the excitation gas. Preferred would be elements with vapor pressures near $10^{-2}$ torr at temperatures between about 30° and 250° C. In some preferred embodiments, a combination of gases could be utilized. Preferred choices of excitation gases are set forth in Table 1 along with the temperature needed to provide an atomic density of about $10^{14}$ atoms/cm$^3$. Laser wavelengths needed with these gases to produce various color are provided in Table 2.

Energy level diagrams for each of these elements are set forth in AA. Radzig and B. M. Smirnov, *Reference Data on Atoms, Molecules, and Ions*, Springer Verlag, NY, 1985, at pages 190, 199, 213, 218, 215 and 220. These pages are incorporated herein by reference.

TABLE 1

| Element | Approximate Operating Temperature |
|---|---|
| Na | 250° C. |
| K | 175° C. |
| Rb | 150° C. |
| Cs | 125° C. |
| Cd | 225° C. |
| Hg | 25° C. | stance excimer lasers, Nd:YAG or copper vapor lasers can be used. However, the repetition rates are only high enough for a small display at the moment. Tunable solid state lasers, or fortuitous wavelength coincidences between existing lasers and atomic transitions could play a major role.

For instance, an alexandrite laser can tune to the 780 nm transition in Rb or the 766 or 770 nm transition in potassium. A doubled Nd:YAG laser (352 nm) comes very close to (and may be tunable to) the $5p_{\frac{1}{2}} \rightarrow 10s_{\frac{1}{2}}$(Rb) or $4p_{\frac{1}{2}} \rightarrow 8s_{\frac{1}{2}}$(K) transitions. Many lasers exist near the Nd:YAG wavelength, but haven't been as extensively developed. It should be possible to find coincidences between laser emissions and some of the wavelengths which can be used in our 3-D display.

For an ultimate device available to the household consumer, semiconductor diode lasers or solid state lasers optically pumped by diode lasers could be provided to replace the dye lasers as sources of light. This is not unreasonable. Diode lasers can already be turned to the first laser transitions in Cs, Rb, and K and powers are approaching the 1 W level.

Persons skilled in the art will also recognize that greater resolution could be provided by utilizing several sets of lasers with each set exciting the gas in separate segments of the chamber. For example in our football game analysis we could have one segment for each 10 yards to increase the resolution by a factor of 10. Other methods of directing the laser beams will be obvious to persons skilled in the art. Laser beam 13 could be provided from the bottom and 25 from one of the sides. Right angle intersections is not required. Whereas visible lasers coincident with the visible fluorescence wavelength intended for viewing preferably should be di-

TABLE 2

| | | | | | | | |
|---|---|---|---|---|---|---|---|
| Cesium: | Laser 1 = | 852 nm $(6s_{\frac{1}{2}} \rightarrow 6p_{3/2})$ | [infrared] | or | 894 nm $(6s_{\frac{1}{2}} \rightarrow 6p_{1/2})$ | [infrared] |
| | Laser 2 = | 621 nm $(6p_{3/2} \rightarrow 8d_{5/2})$ | [orange] | | 636 nm $(6p_{1/2} \rightarrow 9s_{\frac{1}{2}})$ | [red] |
| | | 585 nm $(6p_{3/2} \rightarrow 9d_{5/2})$ | [yellow] | | 584 nm $(6p_{\frac{1}{2}} \rightarrow 10s_{\frac{1}{2}})$ | [green] |
| | | 564 nm $(6p_{3/2} \rightarrow 10d_{5/2})$ | [green] | | 557 nm $(6p_{1/2} \rightarrow 11s_{\frac{1}{2}})$ | [green] |
| | | 550 nm $(6p_{3/2} \rightarrow 11d_{5/2})$ | [green] | | | |
| Rubidium: | Laser 1 = | 780 nm $(5s_{\frac{1}{2}} \rightarrow 5p_{3/2})$ | [infrared] | or | 795 nm $(5s_{\frac{1}{2}} \rightarrow 5p_{\frac{1}{2}})$ | [infrared] |
| | Laser 2 = | 630 nm $(5p_{3/2} \rightarrow 6d_{5/2})$ | [red] | | 607 nm $(5p_{\frac{1}{2}} \rightarrow 8s_{\frac{1}{2}})$ | [orange] |
| | | 572 nm $(5p_{3/2} \rightarrow 7d_{5/2})$ | [yellow] | | 558 nm $(5p_{\frac{1}{2}} \rightarrow 9s_{\frac{1}{2}})$ | [green] |
| | | 543 nm $(5p_{3/2} \rightarrow 8d_{5/2})$ | [green] | | 532 nm $(5p_{\frac{1}{2}} \rightarrow 10s_{\frac{1}{2}})$ | [green] |
| | | 502 nm $(5p_{3/2} \rightarrow 12d_{5/2})$ | [bluegreen] | | | |
| Potassium: | Laser 1 = | 766 nm $(4s_{\frac{1}{2}} \rightarrow 4p_{3/2})$ | [infrared] | or | 770 nm $(4s_{\frac{1}{2}} \rightarrow 4p_{\frac{1}{2}})$ | [infrared] |
| | Laser 2 = | 583 nm $(4p_{3/2} \rightarrow 5d_{5/2})$ | [yellow] | | 578 nm $(4p_{\frac{1}{2}} \rightarrow 7s_{\frac{1}{2}})$ | [yellow] |
| | | 536 nm $(4p_{3/2} \rightarrow 6d_{5/2})$ | [green] | | 532 nm $(4p_{\frac{1}{2}} \rightarrow 8s_{\frac{1}{2}})$ | [green] |
| | | 511 nm $(4p_{3/2} \rightarrow 7d_{5/2})$ | [green] | | 508 nm $(4p_{\frac{1}{2}} \rightarrow 9s_{\frac{1}{2}})$ | [green] |
| | | 480 nm $(4p_{3/2} \rightarrow 10d_{5/2})$ | [blue] | | | |
| Sodium: | Laser 1 = | 589 nm $(3s_{\frac{1}{2}} \rightarrow 3p_{\frac{1}{2}})$ | [yellow] | or | 590 nm $(3s_{\frac{1}{2}} \rightarrow 3p_{\frac{1}{2}})$ | [yellow] |
| | Laser 2 = | 569 nm $(3p_{3/2} \rightarrow 4d_{5/2})$ | [green] | | 616 nm $(3p_{\frac{1}{2}} \rightarrow 5s_{\frac{1}{2}})$ | [orange] |
| | | 498 nm $(3p_{3/2} \rightarrow 5d_{5/2})$ | [bluegreen] | | 515 nm $(3p_{\frac{1}{2}} \rightarrow 6s_{\frac{1}{2}})$ | [green] |
| | | 467 nm $(3p_{3/2} \rightarrow 6d_{5/2})$ | [blue] | | | |
| Cadmium: | Laser 1 = | 229 nm $(5^1S_0 \rightarrow 5^1P_1^0)$ | [ultraviolet] | or | 326 nm $(5^1S_0 \rightarrow 5^3P_1^0)$ | [ultraviolet] |
| | Laser 2 = | 644 nm $(5^1P_1^0 \rightarrow 5^1D_2)$ | [red] | | 480 nm $(5^3P_1^0 \rightarrow 6^3S_1)$ | [blue] |
| | | 466 nm $(5^1P_1^0 \rightarrow 6^1D_2)$ | [blue] | | | |
| | | 515 nm $(5^1P_1^0 \rightarrow 7^1S_0)$ | [green] | | | |
| Mercury: | Laser 1 = | 185 nm $(6^1S_0 \rightarrow 6^1P_1^0)$ | [ultraviolet] | or | 254 nm $(6^1S_0 \rightarrow 6^3P_1^0)$ | [ultraviolet] |
| | Laser 2 = | 579 nm $(6^1P_1^0 \rightarrow 6^1D_2)$ | [yellow] | | 436 nm $(6^3P_1^0 \rightarrow 7^3S_1)$ | [blue] |
| | | 435 nm $(6^1P_1^0 \rightarrow 7^1D_2)$ | [blue] | | | |
| | | 492 nm $(6^1P_1^0 \rightarrow 8^1S_0)$ | [blue] | | | |

In the preferred embodiment first described above, we propose use of continuous wave (CW) dye lasers pumped by ion lasers. We recognize, however, that these lasers are power hungry; typically less than 1% efficient. Other lasers will be preferable in many applications. In a small demonstration model which we constructed in our laboratory, we utilized pulsed dye lasers with cesium vapor for our excitation gas.

Dye lasers pumped by high repetition rate pulsed lasers are a possible alternative to CW lasers. For inrected through the medium into a non-scattering, absorbing beam block, other lasers (like the infrared laser beam 13 in our preferred embodiment) can be directed towards the viewer and blocked by a window which absorbs the laser light, but is transparent to the viewed fluorescence. Such windows can be easily constructed using dielectric coatings.

We also envision schemes for producing visible fluorescence in which this fluorescence does not correspond to the wavelength of either input laser (as it corresponds to the wavelength of laser beam 25 in our preferred embodiment). In this case, both laser beams could be blocked from view with appropriate windows, and scattered laser light will not be observed. In one such scheme which we have demonstrated in our lab the first laser excites cesium atoms from the $6s_{\frac{1}{2}}$ to the $6s_{3/2}$ level with an infrared laser at 852 nm and a second laser further excites these atoms to the $8s_{\frac{1}{2}}$ level with infrared radiation at 761 nm, from which cascade radiation produces visible blue fluorescence at 455 nm and 459 nm. A similar scheme in mercury combines ultraviolet lasers at 254 nm ($6^1S_0 \rightarrow 6^3P_1^0$) and 313 nm ($6^3P_1^0 \rightarrow 6^1D_2$) to produce yellow fluorescence at 579 nm ($6^1D_2 \rightarrow 6^1P_1^0$).

Methods other than those described above can be used to direct the laser beams. For instance, acousto-optic shutter 27 can be replaced with an electro-optic shutter. It can also be eliminated entirely if the scanners (26, 28, 14, 16) are scanned in such a way that the laser beams intersect only at those locations where visible fluorescence is desired, and not at other locations. Furthermore, the laser beams need not be scanned in a regular pattern, but may be scanned together to draw out visible 3-D lines, curves and patterns in the display region.

Furthermore, scanners 28, 14 and 16 operate slowly enough that the acousto-optic scanners of our preferred embodiment can be replaced by readily available mechanical scanners, such as rotating polygon mirrors and rotating holographic diffraction grating disk scanners. Scanner 14 can also be replaced by a galvanometer mirror. Other scanning components and arrangements are also possible.

Instead of programming the control of the laser beams with computer 23, the control could be determined by instructions in a signal broadcast from a television station or a cable TV network. Furthermore, instructions could be recorded on tape as with current TV movies. Persons skilled will soon develop means for recording events in a 3-D manner such that it can be displayed on this device essentially on a real-time basis.

Many applications for this invention have been contemplated. These include 3-D television (as in the football game described in the preferred embodiment) and other entertainment concepts such as 3-D video games. The invention will be useful for air-traffic control, whereby 3-D radar information on airplane locations is displayed in our 3-D display to give a controller better spatial information on relative locations and bearings to better serve the controller in making decisions on airplane guidance and collision avoidance. Similarly, our device will be useful for military applications such as missile tracking and battle management. The medical profession will have a use for our device in the display of 3-D information about internal body organs which is presently collected with x-ray CAT scanners and magnetic resonance imaging devices, but until now viewed in 2-D as on a computer screen. In additional, our invention can in fact be used as a 3-D computer screen useful for many purposes, for example in 3-D computer aided design.

While the invention has been described in terms of scanning laser beams to produce a display which can move in real-time, it is to be understood that the use of light sources other than lasers, for instance narrowband emissions from a mercury lamp, are contemplated, and further, that the scanning elements can be removed and replaced by appropriate beam expansion and aperturing elements if a static display is desired. Also, it should be understood by people skilled in the art that the excitation medium could be composed of molecules rather than atoms and that the medium could be a transparent liquid or even a solid rather than a gas. The scope of the described invention is determined by the appended claims.

We claim:

1. A three-dimensional visual display apparatus comprising:
   (a) a sealed chamber having one or more walls which are transparent to visible light,
   (b) a single active element gas contained in said sealed chamber comprised of atoms or molecules having a ground state and a first excitation state having an excitation energy above said ground state, the difference defining a first energy level and a second excitation state having an excitation energy above said ground state, the difference defining a second energy level, which said second excitation state relaxes with the release of visible light,
   (c) a first laser means for producing a first beam of laser radiation comprised of photons having energy equal or approximately equal to said first energy level,
   (d) a second laser means for producing a second beam of laser radiation comprised of photons having energy equal to or approximately equal to the difference between said second eneryy level and said first energy level,
   (e) means for rapidly moving and directing said first laser beam and said second laser beam so as raise the energy level of a substantial portion of the atoms in small volumes of said gas to said first energy level with said first laser beam and so as to further raise the energy level of a substantial portion of the atoms in portions of said small volumes to said second energy level with said second laser beam so as to produce small volume sources of visible light which in combination, produce what appears to the human eye as a three-dimensional display.

2. The apparatus according to claim 1 wherein the gas is vapor of an element selected from a group of elements consisting of cesium, rubidium, potassium, sodium, cadmium and mercury.

3. The apparatus according to claim 1 wherein the means for rapidly moving said directing said laser beams comprises one or more acousto-optic light deflectors.

4. The apparatus according to claim 3 wherein said one or more acousto-optic light deflectors are controlled by a digital computer.

5. The apparatus according to claim 1 and further comprising a shutter means to interrupt said second beam of laser radiation.

6. The apparatus according to claim 5 wherein said shutter means is an electro-optic modulator.

7. The apparatus according to claim 5 wherein said shutter means is an acousto-optic modulator.

8. A three-dimensional visual display apparatus comprising:
(a) a sealed chamber having one or more walls which are transparent to visible light, (b) a single active element gas contained in said sealed chamber comprised of atoms or molecules having a ground state and a first excitation state having an excitation energy above said ground state, the difference defining a first energy level and a plurality of additional excitation states having excitation energies above said ground state, the difference defining a plurality of additional energy levels, for which said plurality of additional excitation states relax with the release of visible light of a plurality of colors, (c) a first laser means for producing a first beam of laser radiation comprised of photons having energy equal or approximately equal to said first energy level, (d) a plurality of additional laser means for producing a plurality of additional beams of laser radiation comprised of photons having energy respectively equal to or approximately equal to the difference between said plurality of additional levels and said first energy level, (e) means for rapidly moving and directing said first laser beam and said plurality of additional laser beams so as raise the energy level of a substantial portion of the atoms in small volumes of said gas to said first energy level with said first laser beam and so as to further raise the energy level of a substantial portion of the atoms in said small volumes to one of said plurality of additional energy levels with said plurality of additional laser beams so as to produce small volume sources of visible light of selective colors which in combination produce what appears to the human eye as a three-dimensional multi-color display.

9. The apparatus according to claim 8 wherein the gas is vapor of an element selected from a group of elements consisting of cesium, rubidium, potassium, sodium, cadmium and mercury.

10. The apparatus according to claim 8 wherein the means for rapidly moving and directing said laser beams includes one or more acousto-optic light deflectors.

11. The apparatus according to claim 10 wherein said one or more acousto-optic light deflectors are controlled by a digital computer.

12. The apparatus according to claim 8 and further comprising a shutter means to interrupt said additional beams of laser radiation.

13. The apparatus according to claim 12 wherein said shutter means is an electro-optic modulator.

14. The apparatus according to claim 12 wherein said shutter means is an acousto-optic modulator.

15. A three-dimensional visual display apparatus comprising:

(a) a sealed chamber having one or more walls which are transparent to visible light, (b) a single active element gas contained in said sealed chamber comprised of atoms or molecules having a ground state and a first excitation state having an excitation energy above said ground state, the difference defining a first energy level and a second excitation state having an excitation energy above said ground state, the difference defining a second energy level for which said second excitation state relaxes with the release of visible light, (c) a first laser means or light source for producing a first beam of laser or light radiation comprised of photons having energy equal or approximately equal to said first energy level, (d) a second laser means or light source for producing a second beam of laser or light radiation comprised of photons having energy equal to or approximately equal to the difference between said second energy level an said first energy level, (e) means for directing said first laser beam or light source and said second laser beam or light source so as raise the energy level of a substantial portion of the atoms in small volumes of said gas to said first energy level with said first laser beam and so as to further raise the energy level of a substantial portion of the atoms in portions of said small volumes to said second energy level with said second laser beam so as to produce small volume sources of visible light which in combination produce what appears to the human eye as a static three-dimensional display.

16. The apparatus according to claim 15 wherein the gas is a vapor of an element selected from a group of elements consisting of cesium, rubidium, potassium, sodium, cadmium and mercury.

* * * * *